C. H. DUNCAN.
EXHIBITING APPARATUS.
APPLICATION FILED OCT. 16, 1908.

947,058.

Patented Jan. 18, 1910.
3 SHEETS—SHEET 1.

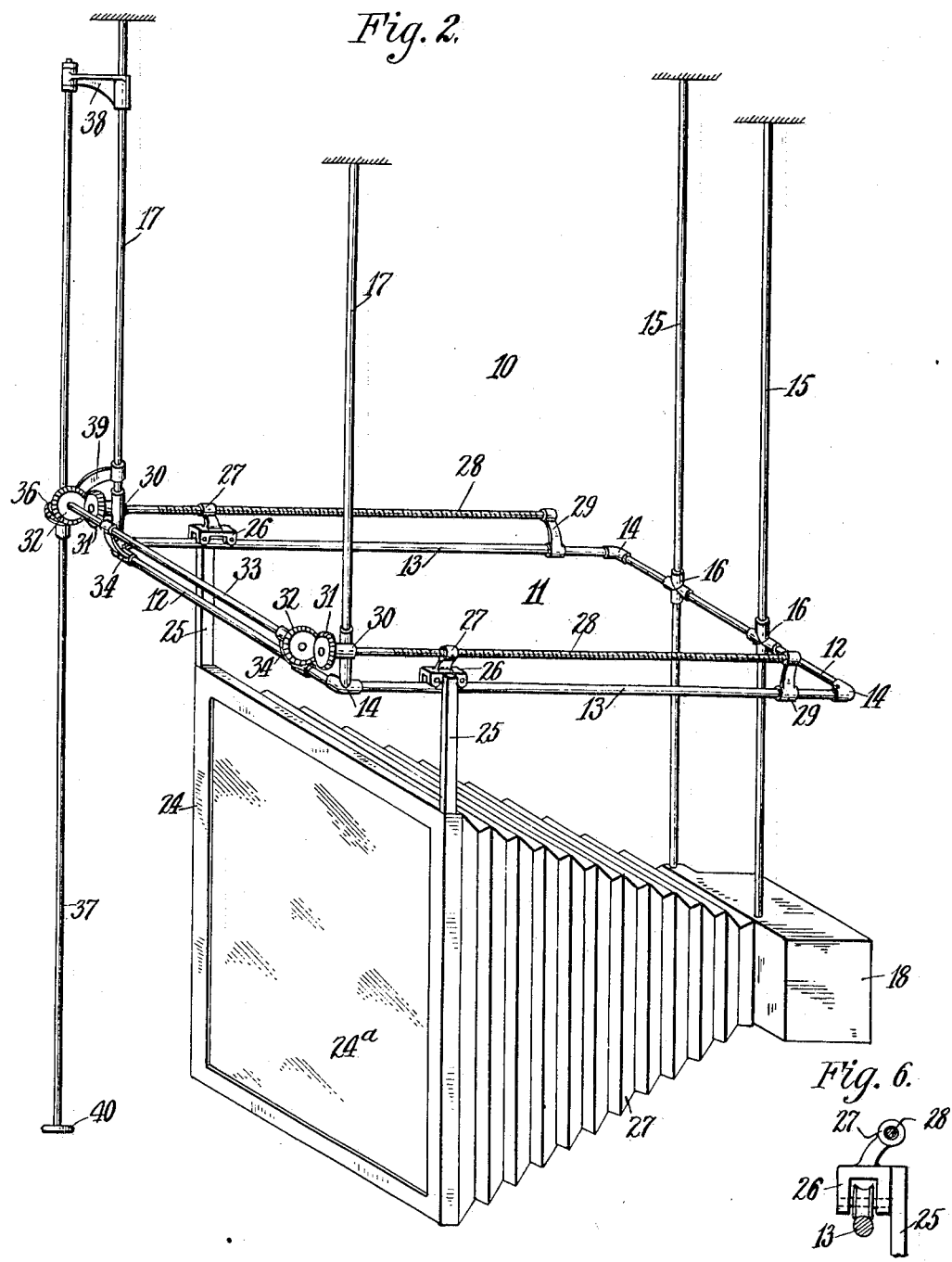

C. H. DUNCAN.
EXHIBITING APPARATUS.
APPLICATION FILED OCT. 16, 1908.
947,058.
Patented Jan. 18, 1910.
3 SHEETS—SHEET 3.
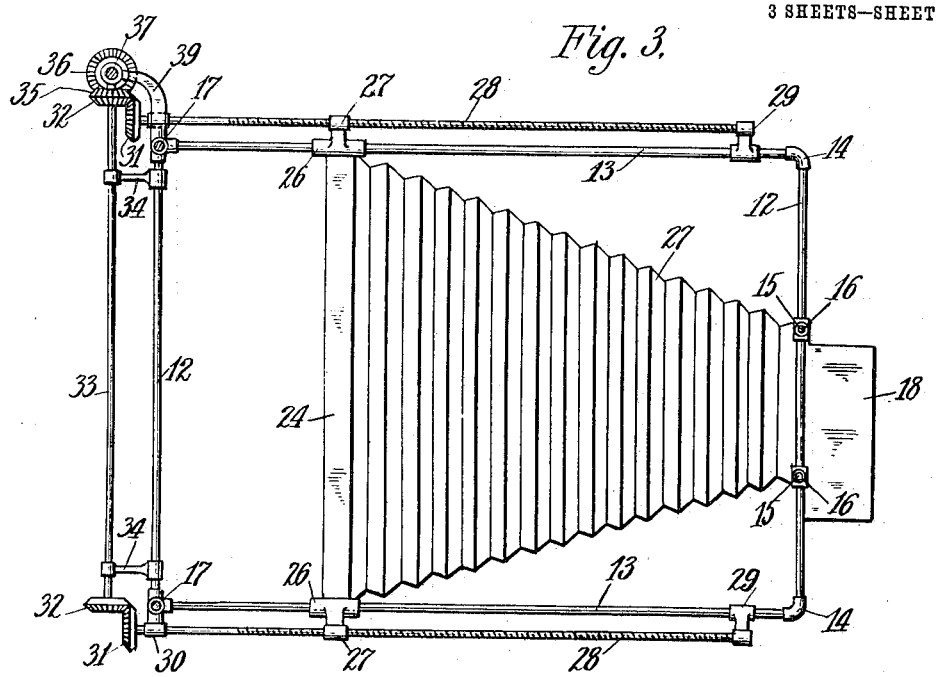
Fig. 3.
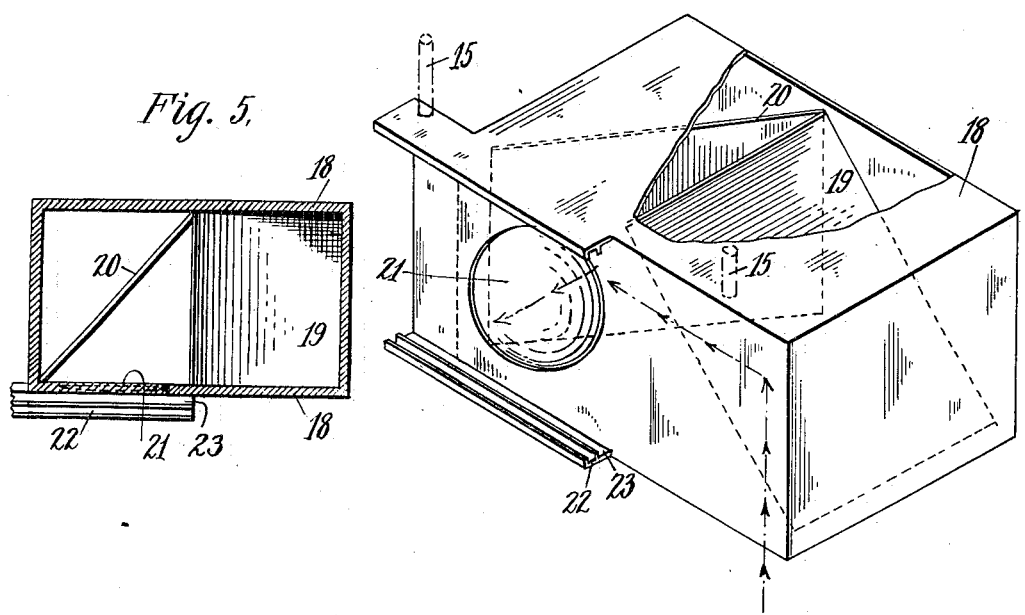
Fig. 4.
Fig. 5.
Witnesses:
John H. Lynch
A. R. Angus
Inventor
Charles H. Duncan
By his Attorney
Conrad A. Dieterich

UNITED STATES PATENT OFFICE.

CHARLES H. DUNCAN, OF NEW YORK, N. Y.

EXHIBITING APPARATUS.

947,058.  Specification of Letters Patent.  Patented Jan. 18, 1910.

Application filed October 16, 1908. Serial No. 458,078.

*To all whom it may concern:*

Be it known that I, CHARLES H. DUNCAN, a citizen of the United States, residing at the city of New York, borough of Manhattan, in the county and State of New York, have invented certain new and useful Improvements in Exhibiting Apparatus, of which the following is a full, clear, and exact specification.

My invention relates to improvements in exhibiting apparatus, and the same has for its object more particularly to provide a simple, efficient and reliable apparatus for displaying objects on a screen or other suitable device, in order that the same may be viewed by a large number of spectators.

Further, said invention has for its object to provide an apparatus by means of which objects, whether animate or inanimate, may be projected upon a screen or other suitable device without reversing the image, and viewed, during all their variations, changes or movements, by spectators from points entirely screened from the object itself.

Further, said invention has for its object more particularly to provide an apparatus adapted for use in medical operating theaters, by means of which the actual field of operation may be disclosed to a large number of students in such a manner that the same may be seen by each individual student as though he were in a position directly above the operation and viewing the same from that point.

Further said invention has for its object to provide an apparatus by means of which portions of the object or subject operated upon may be enlarged and displayed in such enlarged form to a number of spectators.

To the attainment of the aforesaid objects and ends my invention consists in the novel details of construction, and in the combination, connection and arrangement of parts hereinafter more fully described and then pointed out in the claims.

Figure 1:
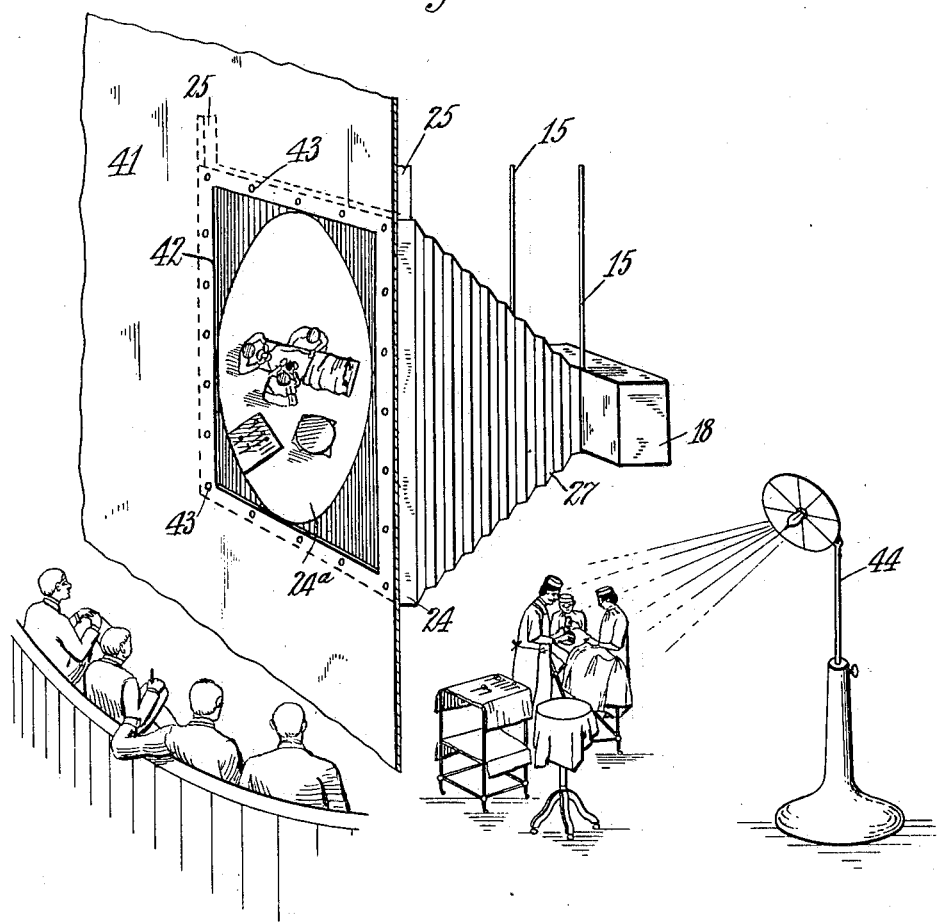
Figure 7:
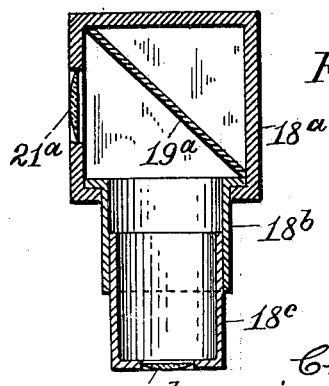

In the accompanying drawings forming part of this specification, wherein like numerals of reference indicate like parts, Figure 1 is a perspective view showing one form of apparatus constructed according to and embodying my said invention shown in use and operation; Fig. 2 is a perspective view showing the apparatus and the means for supporting the same; Fig. 3 is a top or plan view of the apparatus; Fig. 4 an enlarged detail perspective view, partly broken out, showing the casing or means for receiving, reflecting and enlarging the object; Fig. 5 is a top view of said casing with the upper portion thereof removed to show the interior thereof; Fig. 6 is a large detail end view showing one of the carriages for supporting the movable portion of the apparatus, and Fig. 7 is a central vertical section showing a modified form of reflecting and projecting device.

In said drawings 10 designates the apparatus as a whole, comprising a rectangular frame 11 consisting of end members 12, 12 and side members 13, 13 composed of tubing and secured together at their corners by elbows 14, 14. To the rear end member 12 are secured vertical supports 15, 15 also formed of tubing and secured to the end members 12, 12 by T-joints 16, 16.

17, 17 denote supporting members secured at their lower ends to the elbows 14, 14 at the forward end of the frame. The upper ends of the members 15, 15 and 17, 17 are secured to a suitable overhead support or ceiling.

To the lower ends of the supports 15, 15 is secured a rectangular receptacle 18 which is open at its bottom, and within said rectangular receptacle 18 are secured two reflecting surfaces or mirrors 19, 20. The reflecting surface 19 is arranged at an angle of forty-five degrees with its reflecting surface lowermost and over the object, and extending from the upper edge of said mirror or reflecting surface 19 is arranged the mirror or reflecting surface 20 which is also arranged at an angle of forty-five degrees, with its reflecting surface facing the front of said receptacle.

21 denotes a lens secured in the front portion of the receptacle 18, the diameter of which is about one-half of the length of said receptacle, and upon the front of said receptacle directly above and below said lens 21 are provided horizontal guides 22, 23 adapted to receive frames containing colored glasses or narrow receptacles adapted to receive fluids for intensifying certain of the rays of light transmitted through the lens 21.

24 denotes a rectangular frame which is movably supported upon hangers 25, 25 secured at their upper ends to carriages 26, 26 working upon the side members 13, 13 of the frame 11, and within said frame 24 is secured a ground glass 24ª.

27 denotes a bellows secured at its forward end to the rear side of the frame 24, and at is rear end to the forward side of the receptacle 18.

The carriages 26, 26 are provided with upwardly and outwardly projecting portions 27, 27 which are screw-threaded longitudinally to receive feed screws 28, 28 mounted at their rear ends in bearings 29, 29 secured upon the side members 13, 13 and at their forward ends in bearings 30, 30 secured to the vertical supports 17, 17 adjacent to the lower ends thereof. At the forward projecting ends of the screws 28, 28 are fixed bevel gears 31, 31 which mesh with bevel gears 32, 32 secured upon a transverse shaft 33 supported at its opposite ends in bearings 34, 34 secured to the forward end member 12 of the frame 11. At the extreme left-hand end of the transverse shaft 33 is secured a second bevel gear 35 which meshes with a bevel gear 36 fixed upon the vertical shaft 37 supported at its upper ends in a bearing 38 secured to the vertical support 17 near its upper end, and guided intermediate its ends in a bearing 39 secured to said vertical support 17 adjacent to the frame 11. To the lower projecting end of said vertical shaft 37 is secured an operating wheel 40.

41 denotes a screen made of fabric or other flexible material capable of excluding light and supported at its upper edge upon the overhead support or ceiling. 42 denotes an opening around which said screen 41 is secured by tacks 43 to the outer surface of the frame 24 of the apparatus.

When the apparatus is in use the room in which the operation is being performed is separated from the spectators by means of the screen 41 and the portion occupied by the spectators maintained darkened, while the space upon the rear side of the screen 41 in which the operation is being performed is intensely illuminated by one or more electric lamps 44. To exhibit the operation being performed the support or table bearing the subject is placed in position directly below the open-bottom receptacle 18 in such a way that the reflecting surface 19 receives the portion of the subject which is being operated upon. The image received by the reflecting surface 19 is then reflected against the mirror 20 and by means thereof is reflected through the lens 21 and projected upon the ground glass 24ª supported in the frame 24 of the apparatus. Hereupon the shaft 37 is rotated by means of the hand wheel 40 whereby the transverse shaft 33 with its gears 32, 32 will be rotated, which being in mesh with the bevel gears 31, 31 will cause the feed screws 28 to be actuated in one direction or the other and shift the carriages 26, 26 upon the longitudinal frame members 13, 13 and move the said frame 24 backward or forward in order to properly focus the image projected by the lens 21 upon the ground glass 24ª.

It will be noted that the apparatus instead of being provided with two mirrors 19, 20 may be provided with suitable prisms, or one mirror and one prism may be employed.

It is to be particularly noted that by means of my improved display apparatus it becomes possible to exhibit the part of the subject being operated upon without reversing the same, and at the same time disclose the method of performing the operation, without displaying any other part of the subject or the surrounding objects or persons, and that by means of my apparatus each individual spectator is enabled to view the operation precisely in the same manner as though he were actually in position above the subject operated upon and viewing the same from that point.

In the modified illustration at Fig. 7 the receptacle 18ª is provided at its base with an opening in which is rigidly secured the upper flanged end of a tube 18ᵇ, and within said tube 18ᵇ is adjustably arranged a second tubular member 18ᶜ provided at its lower end with a lens 18ᵈ. 19ª denotes a mirror or other suitable reflecting medium arranged at an angle of forty-five degrees to the front of said receptacle, and in said front is mounted a lens 21ª for projecting the enlarged image reflected by the mirror 19ª.

Having thus described my invention, what I claim and desire to secure by Letters Patent is:

1. An apparatus of the character described, comprising a receptacle, reflecting means therein, a translucent member, and means interposed between said reflecting means and said translucent member for projecting the image of an object upon one side of said translucent member so as to be viewed positively from the other side thereof, substantially as specified.

2. An apparatus of the character described, comprising a receptacle, reflecting means therein, a translucent member, and means interposed between said reflecting means and said translucent member for enlarging and projecting the image of an object upon one side of said translucent member so as to be viewed positively from the other side thereof, substantially as specified.

3. An apparatus of the character described, comprising a receptacle, a plurality of reflecting means therein, a translucent member, and means interposed between said reflecting means and said translucent member for projecting the image of an object upon one side of said translucent member so as to be viewed positively from the other side thereof, substantially as specified.

4. An apparatus of the character described, comprising a receptacle, a plurality of reflecting means therein, a translucent member, and means interposed between said reflecting means and said translucent member for enlarging and projecting the image of an object upon one side of said translucent member so as to be viewed positively from the other side thereof, substantially as specified.

5. An apparatus of the character described, comprising a receptacle, a plurality of reflecting means therein, a translucent member, and a lens interposed between said reflecting means and said translucent member for projecting the image of an object upon one side of said translucent member so as to be viewed positively from the other side thereof, substantially as specified.

6. An apparatus of the character described comprising a translucent member, a receptacle arranged to the rear thereof, reflecting means therein, and a lens for projecting the image of an object upon one side of said translucent member so as to be viewed positively from the other side thereof substantially as specified.

7. An apparatus of the character described comprising a translucent member, a receptacle arranged to the rear thereof, a plurality of reflecting means therein, and a lens for projecting the image of an object upon the rear of said translucent member in position to be viewed positively from the front of said translucent member, substantially as specified.

8. An apparatus of the character described, comprising a translucent member, a receptacle; one of said parts being movable relatively to the other, reflecting means arranged in said receptacle, and a lens for projecting the image of an object upon said translucent member in position to be viewed positively from the other side thereof, substantially as specified.

9. An apparatus of the character described, comprising a translucent member, a receptacle, one of said parts being movable relatively to the other, a plurality of reflecting means arranged in said receptacle, and a lens for projecting the image of an object upon one side of said translucent member in position to be viewed positively from the other side thereof substantially as specified.

10. An apparatus of the character described, comprising a translucent member, a receptacle arranged to the rear thereof, reflecting means therein, and a lens for projecting the image of an object upon one side of said translucent member in position to be viewed positively from the other side thereof, substantially as specified.

11. An apparatus of the character described, comprising a translucent member, a receptacle arranged to the rear thereof movable relatively thereto, a plurality of reflecting means therein, and a lens for projecting the image of an object upon one side of said translucent member in position to be viewed positively from the other side thereof, substantially as specified.

12. An apparatus of the character described, comprising a receptacle, a plurality of reflecting means therein, a translucent member movably supported relatively to said receptacle, and a lens interposed between said reflecting means and said translucent member for projecting the image of an object upon one side of said translucent member so as to be viewed positively from the other side thereof, substantially as specified.

13. An apparatus of the character described, comprising a receptacle, a plurality of reflecting means therein, a translucent member, a flexible section extending from said receptacle to said translucent member, and a lens mounted in said receptacle intermediate said reflecting means and said translucent member for projecting the image of an object upon one side of said translucent member so as to be viewed positively from the other side thereof, substantially as specified.

14. An apparatus of the character described comprising a receptacle, a plurality of reflecting means therein, a supporting frame, a translucent member, a flexible screen supported about said translucent member, having an aperture therein, and secured along the edge of said aperture to said frame, and a lens mounted in said receptacle intermediate said reflecting means and said translucent member for projecting the image of an object upon one side of said translucent member so as to be viewed positively from the other side thereof, substantially as specified.

15. An apparatus of the character described, comprising a receptacle, a plurality of reflecting means arranged therein, one part of said reflecting means being arranged at an angle to the longitudinal axis of the receptacle, and the other part of said reflecting means arranged at an angle to the transverse axis of said receptacle, a translucent member supported in front of said receptacle, a flexible section extending from said receptacle to said translucent member, and a lens mounted in said receptacle intermediate the last named reflecting means and said translucent member, substantially as specified.

16. An apparatus of the character described, comprising a receptacle, a plurality of reflecting means arranged therein, one part of said reflecting means being arranged at an angle to the longitudinal axis of the receptacle, and the other part of said reflecting means arranged at an angle to the transverse axis of said receptacle, a frame having a translucent member supported in front of said receptacle, a flexible section extending from said receptacle to said translucent member, a lens mounted in said receptacle intermediate the last named reflecting means and said translucent member, and a flexible screen impervious to light supported in front of said translucent member having an opening therein and secured around the edge of said opening to said frame, substantially as specified.

17. An apparatus of the character described, comprising a receptacle, means for rigidly supporting the same, a plurality of reflecting means arranged in said casing, a frame movably mounted in front of said receptacle, a translucent body secured in said frame, a flexible section connecting said frame with said receptacle, a lens mounted in said receptacle intermediate said reflecting means and said translucent member, and means for shifting said frame and said translucent body relatively to said receptacle, substantially as specified.

18. An apparatus of the character described comprising a receptacle open at its base, a support, a plurality of reflecting means arranged in said receptacle, a frame arranged in front of said receptacle, and movably mounted upon said support, a translucent body secured in said frame, a flexible section connecting said frame with said receptacle, a lens mounted in said receptacle intermediate said reflecting means and said translucent body, and means for shifting said frame and translucent body relatively to said receptacle, substantially as specified.

19. An apparatus of the character described, comprising a rectangular supporting frame, means for supporting said frame, a receptacle open at its bottom, means for suspending said receptacle from said frame, a plurality of reflecting means mounted in said receptacle, a frame arranged in front of said receptacle, members extending from said frame for movably supporting the same upon said rectangular supporting frame, a translucent body secured in said frame, a bellows secured to and extending from said frame to said receptacle, a lens mounted in said receptacle intermediate said reflecting means and said translucent body, and operating means arranged upon said casing for shifting said frame and translucent body therein relatively to said receptacle, substantially as specified.

20. An apparatus of the character described, comprising a rectangular supporting frame, vertical members for supporting said frame, a receptacle open at its bottom secured to a certain of said vertical members, a plurality of mirrors mounted in said receptacle, certain of said mirrors being arranged at an angle of forty-five degrees to the longitudinal axis of said receptacle, and other of said mirrors at an angle of forty-five degrees to the transverse axis of said receptacle, a frame arranged in front of said receptacle, a bellows secured to and extending from said frame to said receptacle, a ground glass mounted in said frame, a lens secured in said receptacle in front of the mirror last named, hangers secured to said frame, carriages secured to the upper ends of said hangers adapted to work upon said supporting frame, feed screws mounted upon said frame and engaging said carriages, and means for actuating said feed screws to shift said frame and ground glass relatively to said receptacle, substantially as specified.

21. An apparatus of the character described, comprising a rectangular supporting frame, vertical members for supporting said frame, a receptacle open at its bottom secured to a part of said vertical members, a pair of mirrors mounted in said receptacle, one of said mirrors being arranged at an angle of forty-five degrees to the longitudinal axis of said receptacle and the others of said mirrors at an angle of forty-five degrees to the horizontal transverse axis of said receptacle, a frame arranged in front of said receptacle, a bellows secured to and extending from said frame to said receptacle, a ground glass mounted in said frame, a lens secured in said receptacle in front of the mirror last named, hangers secured to said last named frame, carriages secured to the upper ends of said hangers adapted to work upon the longitudinal members of said supporting frame, feed screws mounted upon said frame and engaging said carriages, bevel gears secured upon the corresponding ends of said feed screws, a transverse shaft mounted adjacent to said ends of said feed screws, bevel gears upon said shaft, and meshing with the bevel gears on said feed screws, an operating shaft mounted upon said supporting frame, and a bevel gear fixed on said shaft meshing with one of the bevel gears on said transverse shaft, substantially as specified.

22. An apparatus of the character described comprising a rectangular supporting frame, vertical members for supporting said frame, a receptacle open at its bottom secured to a part of said vertical members, a pair of mirrors mounted in said receptacles, one of said mirrors being arranged at an angle of forty-five degrees to the longitudinal axis of said receptacle, and the other of said mirrors at an angle of forty-five degrees to the horizontal transverse axis of said receptacle, a frame arranged in front of said receptacle, a bellows secured to and extending from said frame to said receptacle, a ground glass mounted in said frame, a lens secured in said receptacle in front of the mirror last named, hangers secured to said last named frame, carriages secured to said hangers adapted to work upon the longitudinal members of said supporting frame, feed screws mounted upon said supporting frame and engaging said carriages, bevel gears secured upon the corresponding ends of said screws, a transverse shaft mounted adjacent to said ends of said feed screws, bevel gears upon said shaft, bevel gears meshing with the bevel gears on said feed screws, an operating shaft mounted adjacent to one end of said transverse shaft, a bevel gear fixed on said shaft meshing with a bevel gear on said transverse shaft, and a flexible screen having an opening therein and secured along the edges of said opening to the frame carrying the ground glass, substantially as specified.

23. An apparatus of the character described, comprising a rectangular supporting frame, vertical members for supporting said frame, a receptacle open at its bottom secured to certain of said vertical members, a pair of mirrors mounted in said receptacle, one of said mirrors being arranged at an angle of forty-five degrees to the longitudinal axis of said receptacle, and the other of said mirrors at an angle of forty-five degrees to the longitudinal transverse axis of said receptacle, a frame arranged in front of said receptacle, a bellows secured to and extending from said frame to said receptacle, a ground glass mounted in said frame, a lens secured in said receptacle in front of the mirror last named, a pair of guides secured upon the front of said receptacle above and below said lens, hangers secured to said last named frame, carriages secured to said hangers adapted to work upon the longitudinal members of said supporting frame, feed screws mounted upon said supporting frame and engaging said carriages, bevel gears secured upon the corresponding ends of said feed screws, a transverse shaft mounted adjacent to said ends of said feed screws, bevel gears upon said shaft, bevel gears meshing with the bevel gears on said feed screws, an operating shaft mounted adjacent to one end of said transverse shaft, a bevel gear fixed on said shaft meshing with a bevel gear on said transverse shaft, and a flexible screen having an opening therein and secured along the edges of said opening to the frame carrying the ground glass, substantially as specified.

Signed at the city of New York, in the county and State of New York, this fourteenth day of October, nineteen hundred and eight.

CHARLES H. DUNCAN.

Witnesses:
CONRAD A. DIETERICH,
A. R. ANGUS.